Figure 3:
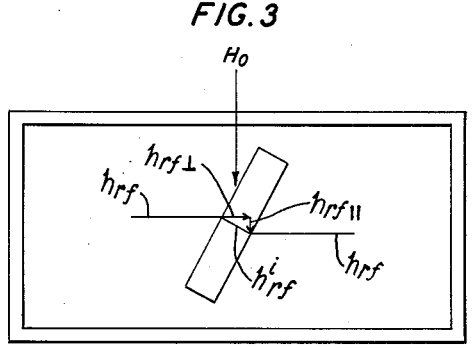

Sept. 11, 1962 M. T. WEISS 3,054,042
GYROMAGNETIC HARMONIC GENERATOR
Filed March 18, 1959 2 Sheets-Sheet 1
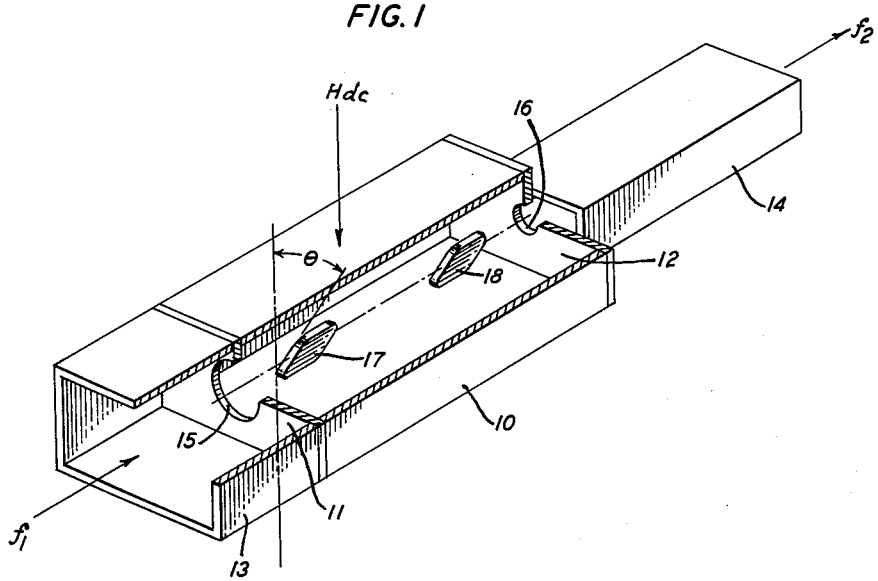
FIG. 1
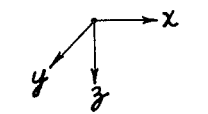
FIG. 2
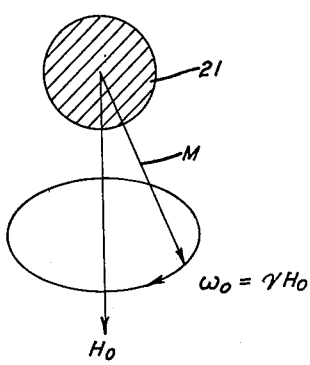
INVENTOR
M. T. WEISS
BY *Roy M. Porter Jr.*
ATTORNEY Sept. 11, 1962   M. T. WEISS   3,054,042
GYROMAGNETIC HARMONIC GENERATOR
Filed March 18, 1959   2 Sheets-Sheet 2

INVENTOR
M. T. WEISS
BY
ATTORNEY

United States Patent Office 3,054,042
Patented Sept. 11, 1962

3,054,042
GYROMAGNETIC HARMONIC GENERATOR
Max T. Weiss, Elizabeth, N.J., assignor to Bell Telephone Laboratories, Incorporated, New York, N.Y., a corporation of New York
Filed Mar. 18, 1959, Ser. No. 800,219
11 Claims. (Cl. 321—69)

This invention relates to high-frequency or microwave signal generators and more particularly to gyromagnetic harmonic generators.

The physical analysis of gyromagnetic phenomenon indicates that the properties of gyromagnetic materials can be explained by assuming that electrons behave as if they are negatively charged spheres which are spinning about their own axes with a fixed angular momentum. If these electrons are subjected to a steady state magnetic field, the magnetic moments of the electrons orient themselves in an equilibrium position in a direction parallel to the magnetic field. If the electrons are then subjected to a magnetic force produced by a high-frequency magnetic field directed at right angles to the steady-state field, a precession of the electrons takes place about the equilibrium position similar in manner to the precession of a gyroscope. This precession may be converted into a signal by placing a pick-up coil in a plane at right angles to both the steady-state field and the driving high-frequency field.

When the precession of the magnetic moment about the equilibrium position is steady and uniform so as to describe a circular path, the frequency of the signal detected by the pick-up coil is equal to the frequency of the driving high-frequency field. In addition, since the magnetic moment rotates about the equilibrium position along a circular path, the displacement angle between the magnetic moment vector and the equilibrium direction is constant. Hence, the projection of the magnetic moment vector along a direction parallel to the direct-current magnetic field is constant and no signal frequency energy is induced along the direction of the direct-current field. The amplitude of the displacement angle and hence, the amplitude of the energy induced in the pick-up coil, is a function of the particular material used, the magnitude of the direct-current magnetic field, and the frequency of the high-frequency field. For a given material, and driving frequency, the precession is a maximum at a particular direct-current field strength. This condition is referred to as gyromagnetic resonance.

If, however, the magnetic precession does not describe a circular path, the projection of the magnetic moment vector along the direction parallel to the direct-current magnetic field is not contsant. In an article entitled "Microwave Frequency Doubling from 9 to 18 KMC in Ferrites," by J. L. Melchor, W. P. Ayres and P. H. Vartanian, published in the May 1957 edition of the Proceedings of the Institute of Radio Engineers, pages 643 to 646, it is pointed out that if the magnetization precesses, for example, in an elliptical orbit about the equilibrium direction, the projection of the magnetization vector, which itself is constant, along an axis parallel to the direct-current field direction varies, and more specifically, has a component of high-frequency magnetization at double the frequency of the excitation field. Accordingly, it has been suggested to use gyromagnetic materials in frequency doubling circuits. However, in frequency doublers of the type just described, the second harmonic energy is induced in a direction parallel to the direct-current biasing field and, as such, is unable to interact with that field. As a consequence, the adjustments of the design parameters of these devices are, of necessity, made with respect to the fundamental frequency energy. For example, maximum harmonic production, under such operating conditions, is obtained when the amplitude of the biasing field is adjusted to produce gyromagnetic resonance at the frequency of the fundamental signal. With the gyromagnetic material so biased, however, substantial amounts of the fundamental frequency energy are dissipated in the material. In particular, since the harmonic output is proportional to the square of the fundamental frequency power, relatively large powers are usually used to drive such devices, and the energy dissipation is, as a consequence, correspondingly large. Harmonic generators built in this manner are, therefore, particularly inefficient, causing excessive heating of the gyromagnetic material at the high fundamental frequency power levels at which such devices are generally used.

It is therefore a general object of this invention to improve the efficiency of harmonic generators using gyromagnetic materials.

It has been discovered, in accordance with the present invention that if the direct-current biasing field is modulated at the fundamental frequency, second harmonic components are generated in a direction normal to the direction of the biasing field. So oriented, the harmonic field and the biasing field are capable of interacting within the gyromagnetic material. Analysis shows that as a result of such interaction, the magnitudes of the second harmonic energy components are related to the harmonic frequency as well as the fundamental frequency and are a maximum when the biasing field is adjusted to produce gyromagnetic resonance at the harmonic frequency. This adjustment of the biasing field is in contrast to the bias adjustment as taught in the prior art in which maximum doubling is produced by resonating the gyromagnetic material at the fundamental frequency. This freedom to bias the gyromatic material at other than the fundamental frequency affords an opportunity to obtain more efficient operation than heretofore as the doubler circuit may now be designed to have low-losses at the fundamental frequency. Substantially greater efficiencies may also be realized by making the gyromagnetic material small and biasing it at, or preferably just below, resonance for the harmonic frequency.

It is therefore a more specific object of this invention to induce harmonic electromagnetic wave energy in polarized gyromagnetic materials wherein the harmonic magnetic field components are induced in a direction normal to the steady magnetic biasing field.

In accordance with the invention a component of high-frequency magnetic field, at the fundamental frequency, is caused to be oriented in a direction parallel to the biasing field. The radio frequency component, by alternately adding to and subtracting from the amplitude of the biasing field, frequency modulates the precessional frequency of the magnetization vector associated with the gyromagnetic material. Sidebands produced as a result of this frequency modulation contain second harmonic components which exist in a plane normal to the magnetizing fields.

In one embodiment of the invention the biasing field and the radio frequency field are applied perpendicular to each other. However, by tilting a vane of gyro-magnetic material at an angle with respect to the biasing field, the tensor demagnetizing factor of the material causes an effective radio frequency field component to exist in a direction parallel to the biasing field. The gyromagnetic material is located in a cavity adjusted to be resonant at the fundamental and harmonic frequencies. The amplitude of the biasing field is adjusted to produce resonance in the magnetic material at substantially the frequency of the harmonic.

In a second embodiment of the invention, a strip line cavity is used in which a component of radio frequency field is applied directly parallel to the biasing field.

Figure 4:
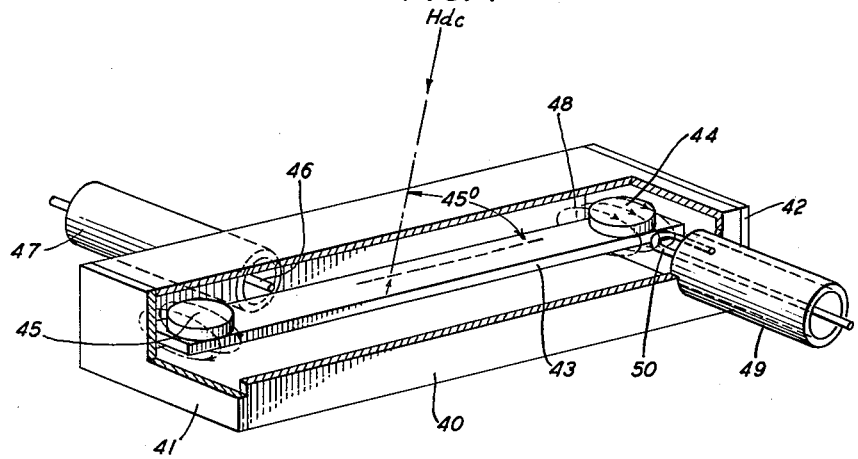

These and other objects and advantages, the nature of the present invention, and its various features, will appear more fully upon consideration of the various illustrative embodiments now to be described in detail in connection with the accompanying drawings, in which:

FIG. 1 is a perspective view of a first embodiment of the invention showing the magnetic field configurations with respect to the orientation of the gyromagnetic vanes;

FIG. 2, given for the purposes of explanation, is a diagrammatical showing of the component magnetic fields applied to the gyromagnetic elements;

FIG. 3, given for the purposes of explanation, shows how the mutually perpendicular radio frequency magnetic field components are produced in the gyromagnetic vanes shown in FIG. 1, and FIG. 4 is a perspective view of a second embodiment of the invention.

Referring to the accompanying drawings and more specifically to FIG. 1, there is shown a frequency doubler in accordance with the present invention. The network comprises a section of bounded electrical transmission line 10 for guiding electromagnetic wave energy which may be a rectangular waveguide of the metallic shield type having a wide internal cross-sectional dimension of at least one-half wavelength of the lowest frequency wave energy to be conducted thereby, and a narrow dimension slightly less than one-half of the wide dimension. So constituted, this waveguide operates in the dominant mode, known in the art as the $TE_{10}$ mode, in which the magnetic flux lines form closed loops which lie in planes parallel to the wider walls of the waveguide. As such, the high-frequency magnetic field has a longitudinal component parallel to the direction of propagation and a transverse field component perpendicular thereto. Waveguide section 10 is bounded at both ends by conductive members 11 and 12, respectively. Abutting thereon, are the rectangular waveguides 13 and 14. The three waveguides 13, 10 and 14 have their longitudinal axes colinearly aligned and their respective narrow and wide walls substantially parallel to each other.

Waveguide 13 has narrow and wide walls that have essentially the same dimensions as waveguide 10, being proportioned to support the same frequency wave energy in the dominant mode as is supported in guide 10, hereinafter referred to as the fundamental frequency wave energy, or merely the fundamental. The input end of waveguide 10 is electromagnetically coupled to waveguide 13 by means of an aperture 15 in member 11. The output end of waveguide 10 is coupled to waveguide 14 by means of an aperture 16 in member 12. Both apertures have their centers located along the guide axis. Waveguide 14 has cross-sectional dimensions approximately one-half those of guide 10, being proportioned to support dominant mode wave energy at twice the frequency of that supported in guide 10.

The length of guide 10, or the distance between irises 15 and 16, is chosen to render the cavity simultaneously resonant at the fundamental frequency $f_1$ and at the second harmonic of the fundamental frequency $f_2$. The tuning of the cavity may be facilitated by the inclusion of a dielectric plug (not shown) in the center of the cavity.

Located at opposite ends of guide 10 and adjacent to apertures 15 and 16 respectively are two vanes or septums 17 and 18, of material capable of exhibiting gyro-magnetic properties over the range of operation frequencies of interest. The term "gyromagnetic material" will be used hereinafter to designate such materials and is to be understood in its accepted sense as designating the class of magnetic polarizable materials having unpaired spin systems involving portions of the atoms thereof that are capable of being aligned by an external magnetic polarizing field and which exhibits a significant precessional motion at a frequency within the range contemplated by the invention under the combined influence of said polarizing field and an orthogonally directed varying magnetic field component. This precessional motion is characterized as having an angular momentum, and a magnetic moment. Typical of such materials are ionized gases, paramagnetic materials and ferromagnetic materials, the latter including the spinels such as magnesium aluminum ferrite, aluminum zinc ferrite and the garnet-like materials such as yttrium iron garnet.

Elements 17 and 18 are magnetically biased by a steady magnetic field $H_{dc}$ at right angles to the wide wall of guide 10. This field may be supplied by a single solenoid comprising a magnetic core having pole pieces bearing against the top and bottom of guide 10 (not shown), by an electric solenoid with a magnetic core of other suitable physical design, by a solenoid without a core, or by a permanent magnetic structure.

The elements 17 and 18 are placed at each end of the cavity along the longitudinal axis of guide 10 and are rotated thereabout so that the planes of their broad surfaces make an angle $\theta$ with the direction of the direct-current biasing field.

The operation of a frequency doubler in accordance with the invention may be explained by referring to FIG. 2. As therein shown, a sphere of gyromagnetic material is located in an $x$—$y$—$z$ coordinate system and is subject to a steady magnetizing field $H_0$ along the $z$-axis. If, simultaneously, a circularly polarized radio frequency magnetic field $$h_{rf\perp}$$

having a frequency $\omega_0 = \gamma H_0$ and rotating in the $x$—$y$ plane (normal to the direction of $H_0$) is applied, the magnetization vector M is caused to precess about an axis parallel to the direction of $H_0$ at frequency $\omega_0$, as shown in FIG. 2. If, in addition, a linearly polarized radio frequency magnetic field $$h_{rf\parallel}$$

is applied in a direction parallel to the direction of the biasing field $H_0$, the precession frequency is caused to vary. For example, when $$h_{rf\parallel}$$

points in the same direction as $H_0$, it adds to the biasing field and increases the precession frequency. On the other hand, when $$h_{rf\parallel}$$

points in the opposite direction, it subtracts from $H_0$ and decreases the precession frequency. Thus, the parallel component of radio frequency field, $$h_{rf\parallel}$$

tends to frequency modulate the rate of precession of the magnetization vector M about the axis parallel to the biasing field $H_0$. The upper sideband produced as a result of such modulation is equal to the sum of the frequencies of the perpendicular ratio frequency $$h_{rf\perp}$$

and the parallel radio frequency $$h_{rf\parallel}$$

Where these are equal, the second harmonic, $2\omega_0$, is produced.

These effects may also be shown mathematically by considering a sphere of gyromagnetic material subjected to a steady magnetic biasing field $H_0$ along the $z$ axis and a radio frequency magnetic field, $h_{rf}$, circularly polarized in the $x$—$y$ plane.

The radio frequency field may be expressed as $$h_x = h_{rf} \sin \omega t \qquad (1)$$

$$h_y = h_{rf} \cos \omega t \quad (2)$$

The equations of motion are then given by $$\frac{dM}{dt} = \gamma(M \times H_t) \quad (3)$$

where $H_t$ is the total field applied to the gyromagnetic material.
Thus, $$\frac{dm_{0x}}{dt} = -\gamma m_{0y} H_0 + \gamma M_z h_{rf} \cos \omega t \quad (4)$$

$$\frac{dm_{0y}}{dt} = \gamma m_{0x} H_0 - \gamma M_z h_{rf} \sin \omega t \quad (5)$$

Taking the second derivative of $m_{0x}$ and substituting for $$\frac{dm_{0y}}{dt}$$

from Equation 5, gives $$\frac{d^2 m_{0x}}{dt} = -\gamma^2 H_0^2 m_{0x} + \gamma^2 M_z H_0 h_{rf} \sin \omega t + \gamma \omega M_z h_{rf} \sin \omega t \quad (6)$$

or $$(-\omega^2 + \gamma^2 H_0^2) m_{0x} = \gamma M h_{rf} \sin \omega t [\gamma H_0 + M] \quad (7)$$

and $$m_{0x} = \frac{\gamma M h_{rf} \sin \omega t}{\gamma H_0 - \omega} \quad (8)$$

Similarly, $$m_{0y} = \frac{\gamma M h_{rf} \cos \omega t}{\gamma H_0 - \omega} \quad (9)$$

If now, in addition, a radio frequency field, $h_z \cos \omega t$, is applied along the $z$ axis, the magnetization components in the $x$—$y$ plane will contain second harmonic terms. Writing the portions of the equations of motion containing second harmonic terms only, gives $$\frac{dm_{2x}}{dt} = -\gamma M m_{2y} - \gamma |m_{0y}| (\cos \omega t)(h_{rf} \cos \omega t) \quad (10)$$

where $m_{2x}$ and $m_{2y}$ are the second harmonic magnetization components in the $x$ and $y$ direction, respectively, and $|m_{0y}|$ is given as $$\frac{\gamma M h_{rf}}{(\gamma H_0 - \omega)}$$

Similarly, $$\frac{dm_{2y}}{dt} = \gamma m_{2x} H_0 + \gamma |m_{0x}| (\sin \omega t)(h_{rf} \cos \omega t) \quad (11)$$

Solving for $m_{2x}$, as above, $$\frac{dm_{2x}}{dt} = -\gamma^2 H_0^2 m_{2x} - \gamma^2 H_0 |m_{0x}| h_{rf} (\sin \omega t)(\cos \omega t)$$
$$- \gamma |m_{0y}| 2\omega h_{rf} (\sin \omega t)(\cos \omega t) \quad (12)$$

or $$(-4\omega^2 + \gamma^2 H_0^2) m_{2x} = \frac{|m_{0x}| h_{rf}}{2} \sin 2\omega t [\gamma H_0 + \omega] \quad (13)$$

Thus, $$m_{2x} = \frac{\gamma |m_{0x}| h_{rf} \sin 2\omega t}{2(\gamma H_0 - 2\omega)} \quad (14)$$

and $$m_{2y} = \frac{\gamma |m_{0y}| h_{rf} \cos 2\omega t}{2(\gamma H_0 - 2\omega)} \quad (15)$$

These expressions indicate the presence of second harmonic terms in the magnetization components in the $x$—$y$ plane due to a radio frequency field in the $z$ direction. In the presence of a suitable environment for the second harmonic, such as a resonant cavity, second harmonic energy is radiated by the magnetization vector.

In the above analysis a sphere was used and the radio frequency field in the $z$ direction was applied directly. However, by using an appropriately shaped gyromagnetic element, the tensor demagnetizing factor can be made to cause an effective radio frequency magnetic field component to exist in the $z$ direction even though the applied radio frequency field is in the $x$—$y$ plane only. Such an arrangement is utilized in FIG. 1. By tilting the vanes 17 and 18 so that their broad surfaces make an angle with respect to the biasing field, the radio frequency magnetic field is distorted within the vanes as shown in FIG. 3. The internal radio frequency field, designated $h_{rf}^i$ may be resolved into two components, one normal to the direct-current field designated $$h_{rf\perp}$$

and another parallel to the direct-current field, designated $$h_{rf\parallel}$$

The two field components and the direct-current field, as explained above, react upon the gyromagnetic material to produce second harmonic wave energy which in turn excites the resonant cavity formed by guide 10 and conductive members 11 and 12. The second harmonic energy $f_2$, is then coupled to waveguide 14 through iris 16.

Analysis of the structure of FIG. 1 indicates that the generation of second harmonic wave energy is a maximum when the angle between the internal direct-current field and the internal radio frequency field is about 45 degrees. This condition is approximated by using vanes having a small width-to-height ratio, tilted at an angle of 45 degrees with respect to the direction of the direct-current field, i.e., $\theta$ equals 45 degrees.

It will be noted from the above analysis that the second harmonic energy is generated in the $x$—$y$ plane, or, in other words, in a plane perpendicular to the biasing field. As such, it interacts with the biasing field and affects the amplitude of the precession of the magnetization vector M. This effect is evidenced in Equations 14 and 15 by the term ($\gamma H_0 - 2\omega$) in the denominator of the expression for each of the magnetization components $m_{2x}$ and $m_{2y}$. If these equations are maximized with respect to the resonant frequency of the gyromagnetic material by minimizing their denominators, it is evident that $\omega_0$ is equal to $2\omega$ or that the material is preferably biased to be resonant at the second harmonic frequency, and not the fundamental. So biased, the second harmonic power developed is maximized with respect to the biasing field and very little energy at the fundamental frequency is absorbed in the gyromagnetic material.

It is obvious that other orientations of the biasing field and gyromagnetic material are possible. For example, instead of tilting the vanes, as in FIG. 1, the vanes may be positioned with their broad surfaces parallel to the narrow walls of the guide and the biasing field, in turn, can be tilted so as to be applied at an angle with respect to the gyromagnetic vanes. In either arrangement, frequency doublers in accordance with the invention will be realized as long as there is a component of radio frequency magnetic field parallel to the biasing field and a component normal to the biasing field.

In a second embodiment of the invention shown in FIG. 4, a strip line cavity is used. The cavity comprises a section of conductively bounded channel 40, having conductive end plates 41 and 42. Symmetrically located within said channel and extending between the end plates is the rectangular conductive rod 43. The rod and channel are proportioned to resonate at the frequency of the fundamental and the second harmonic. Located at the ends of rod 43 are the disks of gyromagnetic material 44 and 45. The disks are magnetically biased by means of a steady field $H_{dc}$ applied at a 45 degree angle to rod 43.

In operation, power is applied to the cavity at the fundamental frequency $f_1$ by means of a capacitive probe 46 fed from the coaxial line 47. The probe is centered between the ends 41 and 42 of the cavity. The magnetic field loops of the signal frequency are illustrated by the closed loops 48 encircling conductive rod 43. The loops lie in planes perpendicular to the rod axis and vary in intensity sinusoidally along the length of the conductor. Rod 43 is a multiple of half-wavelengths long so that it is resonant at the fundamental frequency, and, more specifically, extends an odd number of quarter-wavelengths on either side of probe 46 so that the electric field at the fundamental is a maximum in the region of the probe, and the magnetic fields at the ends of rod 43 are a maximum in the vicinity of the disks 44 and 45.

The magnetic field components 48 are oriented at an angle with respect to the biasing field $H_{dc}$, and may be considered to comprise the two mutually perpendicular components $$h_{rf\perp}$$

perpendicular to the biasing field, and $$h_{rf\parallel}$$

parallel to the biasing field. Second harmonic energy induced in the disks 44 and 45 as a result of the action of the two radio frequency fields and the biasing field is coupled out of the cavity by means of loop 50 connected to the coaxial line 49 located at one end of the cavity.

As in the case of FIG. 1, the direct-current magnetic field $H_{dc}$ is adjusted to resonate the ferrite disks at about the frequency of the second harmonic. So biased, the cavity appears as a high Q, low-loss cavity at the fundamental frequency.

In all cases it is understood that the above-described arrangements are illustrative of a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. An electromagnetic wave frequency doubler comprising a multiple resonant cavity supportive of a system of standing waves and proportioned to be resonant at a given radio frequency and at a second harmonic of said given frequency, a magnetically polarizable element of material capable of exhibiting gyromagnetic properties located within a region of said cavity wherein the radio frequency magnetic fields associated with said standing waves at both said frequencies have a substantial intensity, means for exciting said cavity at said given frequency, means for applying a magnetic polarizing field to said element for establishing within said element a first component of radio frequency magnetic field parallel to said polarizing field and a second component of radio frequency magnetic field perpendicular to said polarizing field, and means for extracting wave energy from said cavity at said second harmonic of said given frequency.

2. The combination according to claim 1, wherein said element is a thin vane having a pair of parallel broad surfaces, the planes of said surfaces being rotated by an angle $\theta$ with respect to the direction of said polarizing field.

3. The combination according to claim 2 wherein said angle $\theta$ is equal to 45 degrees.

4. The combination according to claim 1, wherein said gyromagnetic material is biased to resonance at said harmonic frequency.

5. An electromagnetic wave frequency doubler comprising a section of conductively bounded rectangular waveguide having broad and narrow cross-sectional dimensions proportioned to support wave energy at a frequency $f_1$ in the dominant mode, a pair of conductive members transversely disposed across the ends of said section to form a resonant cavity at said frequent $f_1$, means for exciting said cavity at said frequency $f_1$ and means for extracting from said cavity wave energy at twice said frequency, at least one vane of magnetically polarizable material capable of exhibiting gyromagnetic properties over a range of frequencies including $f_1$ and the second harmonic thereof having a pair of broad parallel surfaces located within said cavity in a region of high magnetic field intensity, and means for magnetically polarizing said vane at an angle $\theta$ with respect to said broad surfaces.

6. The combination according to claim 5 wherein said exciting means and said extracting means comprise an aperture in each of said conductive members having their centers along the longitudinal axis of said guide; wherein a vane of gyromagnetic material extends longitudinally within said guide along the axis thereof adjacent each of said members; and wherein said vanes are rotated about said axis by an angle of 45 degrees.

7. A conductively bounded cavity comprising a section of hollow rectangular channeling, shorting end plates transversely disposed across each end of said section, a conductive rod extending longitudinally along the axis of said channel from one of said end plates to the other of said end plates and conductively fastened thereto, said rod and said cavity forming a strip line circuit proportioned to be resonant at a given frequency $f_1$, at least one disk of magnetically polarizable material capable of exhibiting gyromagnetic properties located at an end of said rod, means for magnetically biasing said disk at an angle of approximately 45 degrees with respect to said rod, means for energizing said cavity at said frequency $f_1$, and means for extracting energy from said cavity at a frequency $2f_1$.

8. The combination according to claim 7 wherein said element is biased to gyromagnetic resonance at the frequency $2f_1$.

9. The combination according to claim 7 wherein said element is biased to produce gyromagnetic resonance at a frequency between $f_1$ and $2f_1$.

10. A frequency harmonic generator comprising an element of magnetically polarizable material capable of exhibiting gyromagnetic effects over a given frequency range, means for aligning the magnetization vectors of said element in a given direction, means for causing said magnetization vectors to precess about axes parallel to said direction at a frequency within said range, means for frequency modulating the precessional frequency of said vectors at a rate equal to said frequency, and means for coupling to wave energy of twice said frequency having magnetic field components induced in said element in a plane normal to said given direction.

11. The combination according to claim 10 wherein said aligning means induces gyromagnetic resonance in said element at substantially twice said frequency.

References Cited in the file of this patent

UNITED STATES PATENTS

| 2,863,998 | Marie | Dec. 9, 1958 |
| 2,922,876 | Ayres et al. | Jan. 26, 1960 |

OTHER REFERENCES

"A Solid-State Microwave Amplifier and Oscillator Using Ferrites," by M. T. Weiss; published in Physical Review, vol. 107, No. 1 (July 1, 1957), page 317 relied on.

"Microwave Frequency Doubling From 9 to 18 KMC in Ferrites," by Melcor, Ayres, and Vartanian in Proceedings of I.R.E. (May 1957), pages 643–646 relied on.